(12) United States Patent
Wang et al.

(10) Patent No.: US 11,325,419 B2
(45) Date of Patent: May 10, 2022

(54) STEEL CORD FOR RUBBER REINFORCEMENT

(71) Applicant: NV Bekaert SA, Zwevegem (BE)

(72) Inventors: He Wang, Jiangyin (CN); Yuping Wang, Jiangyin (CN); Ming Zhao, Jiangyin (CN)

(73) Assignee: NV BEKAERT SA, Zwevegem (BE)

( * ) Notice: Subject to any disclaimer, the term of this patent is extended or adjusted under 35 U.S.C. 154(b) by 105 days.

(21) Appl. No.: 16/756,591

(22) PCT Filed: Oct. 23, 2018

(86) PCT No.: PCT/EP2018/078999
§ 371 (c)(1),
(2) Date: Apr. 16, 2020

(87) PCT Pub. No.: WO2019/096548
PCT Pub. Date: May 23, 2019

(65) Prior Publication Data
US 2020/0238761 A1 Jul. 30, 2020

(30) Foreign Application Priority Data
Nov. 17, 2017 (WO) ................ PCT/CN2017/111742

(51) Int. Cl.
*B60C 9/00* (2006.01)
*D07B 1/06* (2006.01)
(Continued)

(52) U.S. Cl.
CPC ............ *B60C 9/0007* (2013.01); *D07B 1/062* (2013.01); *D07B 1/22* (2013.01);
(Continued)

(58) Field of Classification Search
CPC .. D07B 1/062; D07B 1/22; D07B 2401/2055; B60C 9/0007; B60C 2209/2096
See application file for complete search history.

(56) References Cited

U.S. PATENT DOCUMENTS

| 4,022,009 A | * | 5/1977 | van Assendelft | ...... D07B 1/062 57/212 |
| 5,609,014 A | | 3/1997 | Obara et al. | |

(Continued)

FOREIGN PATENT DOCUMENTS

| EP | 1 063 346 | 12/2000 |
| EP | 1 067 236 | 1/2001 |

(Continued)

OTHER PUBLICATIONS

Machine Translation (Google) JPH0931876, retrieved Sep. 23, 2021.*

(Continued)

*Primary Examiner* — Shaun R Hurley
(74) *Attorney, Agent, or Firm* — Wenderoth, Lind & Ponack, L.L.P.

(57) ABSTRACT

A steel cord containing a core layer and an sheath layer, the core layer containing a plurality of core wires with a number of n and the sheath layer comprises a plurality of sheath wires with a number of m, and the steel cord has a flat cross-section with a major axis and a minor axis, the flat cross-section has a flat ratio being the ratio of the length of the major axis and the length of the minor axis, the flat ratio is more than 1.2, the steel cord has a breaking load being $BL_{cord}$, the core wires and the sheath wires have a sum breaking load being Sum $BL_{wires}$ when the core wires and the sheath wires are un-twisted from the steel cord, $BL_{cord}$ and Sum $BL_{wires}$ satisfies the following formula: $BL_{cord}$/Sum $BL_{wires}$>96%. The steel cord has higher breaking load.

9 Claims, 2 Drawing Sheets

(51) Int. Cl.
   *D07B 1/22* (2006.01)
   *B60C 9/20* (2006.01)
(52) U.S. Cl.
   CPC ............... *B60C 2009/0085* (2013.01); *B60C 2009/0092* (2013.01); *B60C 2009/2077* (2013.01); *B60C 2009/2096* (2013.01); *D07B 2401/2055* (2013.01)

(56) References Cited

U.S. PATENT DOCUMENTS

| | | | | |
|---|---|---|---|---|
| 6,109,017 | A * | 8/2000 | Kawatani | B60C 9/0007 152/527 |
| 6,146,760 | A * | 11/2000 | Helfer | B60C 9/0007 428/295.1 |
| 6,273,160 | B1 * | 8/2001 | Helfer | B32B 25/02 152/451 |
| 6,748,731 | B2 | 6/2004 | Kobayashi et al. | |
| 10,975,519 | B2 * | 4/2021 | Wang | D07B 1/062 |
| 2002/0157754 | A1 * | 10/2002 | Falzolgher | B60C 9/2006 152/527 |
| 2003/0188525 | A1 * | 10/2003 | Kobayashi | D07B 1/0613 57/212 |
| 2016/0101651 | A1 * | 4/2016 | Lee | D07B 7/025 57/219 |
| 2017/0073888 | A1 * | 3/2017 | Gallet | D07B 7/022 |
| 2019/0071820 | A1 * | 3/2019 | Wang | B60C 9/0007 |

FOREIGN PATENT DOCUMENTS

| | | |
|---|---|---|
| EP | 2 689 939 | 1/2014 |
| JP | 09-31876 | 2/1997 |
| JP | 2007-063706 | 3/2007 |

OTHER PUBLICATIONS

International Search Report dated Jan. 31, 2019 in International (PCT) Application No. PCT/EP2018/078999.

* cited by examiner

STEEL CORD FOR RUBBER REINFORCEMENT

TECHNICAL FIELD

The invention relates to a steel cord for rubber reinforcement. The invention also relates to a rubber article comprising the steel cords.

BACKGROUND ART

Lightweight tire becomes popular, as it saves the energy and thereby reduces the pollution to the environment. There are several ways to reach lightweight tire, for example, the application of high strength cords to reduce the total amount of the steel cord in the tire thereafter to reduce the weight of the tire, or the application of flat cord to reduce the thickness of the belt layer thereafter to reduce the weight of the tire.

For the application of flat cord in tire, there are quite many solutions to have a flat cord.

EP2689939 discloses a steel cord with a structure of 2+n, wherein the two core wires are contacting with each other, and n sheath wires are twisted with the two core wires, and the core wire has a diameter bigger than the sheath wire.

JP2007063706 discloses a steel cord with a structure of 2+n, n is 1 to 3, wherein the two core wires are contacting with each other, and n sheath wires are twisted with the two core wires.

U.S. Pat. No. 6,748,731 discloses a steel cord with a structure of m+n, wherein the core wires are arranged in side-by-side configuration and no voids are formed between the core wires.

For the above steel cords, they are made by two steps. The core wires are arranged in parallel, and the outer wires are twisted with the core wires. This is one type of flat cord.

Alternatively, another type of flat cord could be a compact flat cord.

U.S. Pat. No. 5,609,014 discloses a steel cord with a 1×9 structure, comprising three core wires and six outer wires. The core wires and the outer wires are twisted in the same direction with the same twist pitch. The elongation under a load of 50N (PLE) is 0.09 to 0.125%, and the flatness of the cord defined by the ratio of longer diameter to shorter diameter is 1.05 to 1.20. The rubber penetration of the steel cord is not sufficient because of the low PLE. And the flat ratio is small and this makes the reduction of the thickness of the belt being limited.

The new flat cord with better performance is desired

DISCLOSURE OF INVENTION

The present invention is to provide a new steel cord with better performance.

Another object of the present invention is to provide a method for making the steel cord with better performance.

A further object of the present invention is to provide a rubber article reinforced by the steel cords with better performance.

According to one object of the invention, a steel cord is provided, the steel cord comprises a core layer and an sheath layer, the core layer comprises a plurality of core wires with a number of n and the sheath layer comprises a plurality of sheath wires with a number of m, the steel cord has a flat cross-section with a major axis and a minor axis, the flat cross-section has a flat ratio being the ratio of the length of the major axis and the length of the minor axis, the flat ratio is more than 1.2, the steel cord has a breaking load being $BL_{cord}$, the core wires and the sheath wires have a sum breaking load being Sum $BL_{wires}$ when the core wires and the sheath wires are un-twisted from the steel cord, the $BL_{cord}$ and the Sum $BL_{wires}$ satisfies the following formula: $BL_{cord}$/Sum $BL_{wires}$>96%.

The length of the major axis and the length of the minor axis of the steel cord are measured by micro-calliper.

The invention steel cord has an improved breaking load. "$BL_{cord}$/Sum $BL_{wires}$>96%" means the core layer and the sheath layer have better length matching, as a result, when subjected to an external force, the external force is more uniformly distributed between the core layer and the sheath layer, and therefore the steel cord has improved breaking load. This is the finding of the inventor.

When a flat steel cord is made by flattening a round steel cord, the round steel cord has good length matching of the core layer and the sheath layer before being flattened, i.e. $BL_{cord}$/Sum $BL_{wires}$ is about 100%, however, because of the process of flattening, the flat steel cord has worse length matching of the core layer and the sheath layer, its $BL_{cord}$/Sum $BL_{wires}$ decreases quite a lot, this means the core layer and the sheath layer of the flat steel cord have bad performance on length matching, when subjected a force from the external, the external force can't be well uniformly distributed between the core layer and the sheath layer, this leads to a risk that one layer, either the core layer or the sheath layer, would break earlier than another layer, and this causes the steel cord has a breaking load lower than the expectation. If the core layer and the sheath layer break at the same time, this is the ideal length matching. The improvement on length matching is to reduce the difference on the breaking time of the core layer and the breaking time of the sheath layer. The invention solves this problem and provides a flat steel cord having better performance on length matching of the core layer and the sheath layer and having improved breaking load.

Preferably, $BL_{cord}$ and Sum $BL_{wires}$ satisfies the following formula: $BL_{cord}$/Sum $BL_{wires}$>97%. This leads to higher steel cord breaking load.

According to the present invention, the steel cord breaking load is measured according to the method mentioned in the standard GBT33159-2016, the breaking load of single steel wire is measured according to the principle mentioned in the standard ISO6892-1:2009 with some particular setting like the clamp length being 250 mm and the test speed being 100 mm/min.

Preferably, the flat ratio of the steel cord is less than 1.8. More preferably, the flat ratio of the steel cord is ranging from 1.25 to 1.50. The steel cord has been subjected to a flattening process to realize the high flat ratio.

The steel cord itself is a flat cord with a flat cross-section. When the number of the core wires is more than 2, for example 3, the core wires of the steel cord are forming a flat shape which has a major axis and a minor axis, the ratio of the major axis and the minor axis is more than 1.2 as measured by optical microscope, and the major axis and the minor axis are measured on the core layer of the steel cord without un-twisting the sheath wires out from the steel cord, the major axis of the core layer or core wires is parallel with the major axis of the flat cross-section of the flat cord, and the minor axis of the core layer or core wires is parallel with the minor axis of the flat cross-section of the flat cord. The flat shape with this flat ratio of the core layer ensures a full rubber penetration inside the core wires, as a result the failure of the steel cord caused by the corrosion of the core wires is significantly reduced, in addition, the flat ratio of the core layer ensures a stable flat shape of the steel cord.

When the number of the core wire is 2 and when the alignment of the core wires is perpendicular to the major axis of the steel cord by detecting the cross-section of the steel cord, the phenomenon of at least one core wire being in contact with one of the sheath wires is not always existing along the length of the steel cord.

Preferably n ranges from 2 to 3, and m ranges from 6 to 12. The possible structure is 2+6, 2+7, 2+8, 3+6, 3+7, 3+8, 3+9, 3+10, 3+11, 3+12, 2+6, 2/7, 2/8, 3/6, 3/7, 3/8, 3/9, 3/10, 3/11, 3/12. "n+m" means the core wires have a twist pitch of more than 300 mm, n/m means the core wires have a twist pitch and twist direction as same as the sheath wires.

Preferably, the core wires have a twist pitch less than 30 mm or have a twist pitch more than 300 mm.

For a preferable solution, the core wires have twist pitch less than 30 mm, and the sheath wires have a same twist pitch and same twist direction as the core wires. The core wires and the sheath wires have the same twist pitch, this means the steel cord is made by one step twisting, and this makes the steel cord being compact. Normally for an existing compact steel cord, its PLE is too low to achieve full rubber penetration property due to the compact configuration. The invention compact steel cord has high PLE which ensures the compact steel cord with full rubber penetration property because of length matching adjustment. Preferably, such steel cord has an elongation under a load of 50N with a preload of 2.5N being more than 0.125%. More preferably, such steel cord has an elongation under a load of 50N with a preload of 2.5N ranging from 0.15% to 0.3%. This ensures the full rubber penetration of the steel cord and thereby improve the corrosion resistance and the lifetime of the steel cord.

As a alternative preferable solution, the core wires have twist pitch more than 300 mm, and the sheath wires have a twist pitch being less than 30 mm. Preferably such steel cord has an elongation under a load of 50N with a preload of 2.5N ranging from 0.03%-0.1%.

According to the invention, "elongation under a load of 50N with a preload of 2.5N" is measured by using screw action jaw type, and is expressed in percent and is the extension between 2.5N and 50N divided by the specimen gauge length multiplied by 100.

According to second object of the present invention, a method for making a steel cord is provided, the method comprises the following steps:
a. providing core wires and sheath wires;
b. twisting the sheath wires around the core wires thereby to form a steel strand with substantially round cross-section;
c. using two reverse pulleys one after another for improving the length matching of the core layer and the sheath layer;
d. flattening the steel strand by roller straightener to form the steel cord with a flat cross-section.

The steel cord made by the above mentioned method, particularly by using the two reverse pulleys in step c, has better length matching between the core layer and the sheath layer, and this makes the steel cord having higher breaking load. The reverse pulley is a pulley with a groove on the surface of its round side, and the groove has a U shape. The steel strand rotates inside the groove when passing through the pulleys, and this leads to a twisting-in and twisting-off operation on the steel strand when the steel strand leaves the pulleys. By doing this, the length matching of the core layer and the sheath layer is much improved and the breaking load of the steel cord is significantly improved. The U-shaped groove of the pulley is to let the steel strand rotating when the steel strand is guided to pass through the pulley, thereby to improve the length matching of the core layer and the sheath layer. For sure the groove can have other shape with the same function, to let the steel strand rotating.

Preferably, the steel cord is made by one step twisting, for example the cord is made by twisting sheath wires around core wires sheath wires in one step bunching process, as a result the core wires and the sheath wires have the same twist pitch and the same twist direction. As an alternative, the steel cord is made by firstly twisting core wires, and secondly twisting sheath wires around the core wire and meanwhile un-twisting core wires, as a result, the core wires have a twist pitch more than 300 mm.

The steel cord is used for reinforcing rubber articles, including rubber tire, rubber belt or hose.

According to the third object of the invention, a tire is provided, the tire comprises the belt layer, the carcass layer, the tread layer and a pair of bead portions, the belt layer is embedded with the steel cords, the steel cord comprises a core layer and an sheath layer, the core layer comprises a plurality of core wires with a number of n and the sheath layer comprises a plurality of sheath wires with a number of m, the steel cord has a flat cross-section with a major axis and a minor axis, the flat cross-section has a flat ratio being the ratio of the length of the major axis and the length of the minor axis, the flat ratio is more than 1.2, the steel cord has a breaking load being $BL_{cord}$, the core wires and the sheath wires have a sum breaking load being Sum $BL_{wires}$ when the core wires and the sheath wires are untwisted from the steel cord, the $BL_{cord}$ and the Sum $BL_{wires}$ satisfies the following formula: $BL_{cord}$/Sum $BL_{wires}$>96%.

The tire according to the present invention has longer lifetime.

BRIEF DESCRIPTION OF FIGURES IN THE DRAWINGS

MODE(S) FOR CARRYING OUT THE INVENTION

Figure 1:
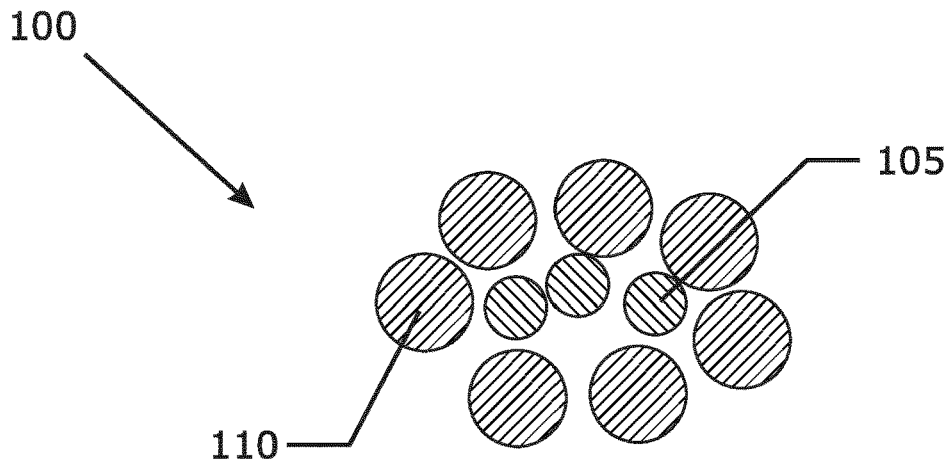
FIG. 1 shows an invention steel cord with a structure of 3/7 compact cord.

The core wires and the sheath wires for steel cord are made from a wire rod.

The wire rod is firstly cleaned by mechanical descaling and/or by chemical pickling in a $H_2SO_4$ or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter d1, e.g. at about 3.0 to 3.5 mm, the dry drawn steel wire is subjected to a first intermediate heat treatment, called patenting. Patenting means first austenitizing until a temperature of about 1000° C. followed by a transformation phase from austenite to pearlite at a temperature of about 600-650° C. The steel wire is then ready for further mechanical deformation.

Thereafter the steel wire is further dry drawn from the first intermediate diameter d1 until a second intermediate diameter d2 in a second number of diameter reduction steps. The second diameter d2 typically ranges from 1.0 mm to 2.5 mm.

At this second intermediate diameter d2, the steel wire is subjected to a second patenting treatment, i.e. austenitizing again at a temperature of about 1000° C. and thereafter quenching at a temperature of 600 to 650° C. to allow for transformation to pearlite.

If the total reduction in the first and second dry drawing step is not too big a direct drawing operation can be done from wire rod till diameter d2.

After this second patenting treatment the steel wire is usually provided with a brass coating: copper is plated on the steel wire and zinc is plated on the copper. A thermo-diffusion treatment is applied to form the brass coating. Alternatively, the steel wire can be provided with a ternary alloy coating, including copper, zinc and a third alloy of cobalt, titanium, nickel, iron or other known metal.

The brass-coated steel wire is then subjected to a final series of cross-section reductions by means of wet drawing machines. The final product is a steel wire with a carbon content above 0.60 percent by weight, e.g. higher than 0.70 percent by weight, or higher than 0.80 percent by weight, or even higher than 0.90 percent by weight, with a tensile strength typically above 2000 MPa, e.g. above 3800-2000 d Mpa, or above 4100-2000 d MPa or above 4400-2000 d MPa (d is the diameter of final steel wire) and adapted for the reinforcement of elastomer products.

Steel wires adapted for the reinforcement of tyres typically have a final diameter ranging from 0.05 mm to 0.60 mm, e.g. from 0.10 mm to 0.40 mm. Examples of wire diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm.

After the preparation of the core wires and the sheath wires, the core wires and the sheath wires are subjected to the twisting process, the sheath wires are twisted around the core wires to form a steel strand with substantially round cross-section. For n+m construction, the core wires are firstly twisted and then un-twisted to have the twist pitch more than 300 mm. For n/m construction, the core wire are twisted in the same twist direction and same twist pitch in one step as the sheath wires to have a twist pitch less than 30 mm.

After that, two reverse pulleys are used one after another for making the length of the core layer and the length of the sheath layer being better matched.

Finally, the steel strand is flattened by roller straightener to form the steel cord with a flat cross-section.

FIG. 1 illustrates the first embodiment of the invention. Steel cord 100 has a structure of 3/7. The steel cord 100 has three core wires 105 and seven sheath wires 110. The core wires 105 have a diameter of 0.20 mm while the sheath wires 110 have a diameter of 0.32 mm. The steel cord 100 has an elongation under the load of 50N with a preload of 2.5N is 0.361%. The flat ratio of the steel cord 100 is 1.52, and $BL_{cord}$/Sum $BL_{wires}$ is 100.6%, Sum $BL_{wires}$ is measured on the core wires and sheath wires which are untwisted from the cord. The core wires 105 and the sheath wires 110 have the same twisting pitch of 16 mm.

A second embodiment is also a 3/7 cord. The core wires have a diameter of 0.20 mm while the sheath wires have a diameter of 0.32 mm. The steel cord has an elongation under the load of 50N with a preload of 2.5N is 0.236%. The flat ratio of the steel cord 100 is 1.53, and $BL_{cord}$/Sum $BL_{wires}$ is 101.7%, Sum $BL_{wires}$ is measured on the core wires and sheath wires which are untwisted from the cord. The core wires 105 and the sheath wires 110 have the same twisting pitch of 18 mm.

Figure 3:
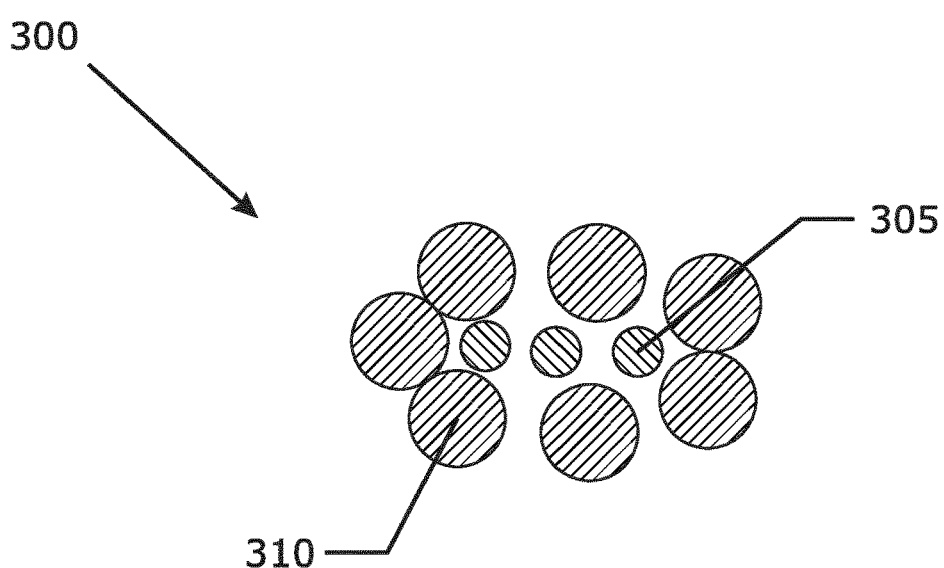
FIG. 3 shows an invention steel cord with a structure of 3+7 cord.
Figure 4:
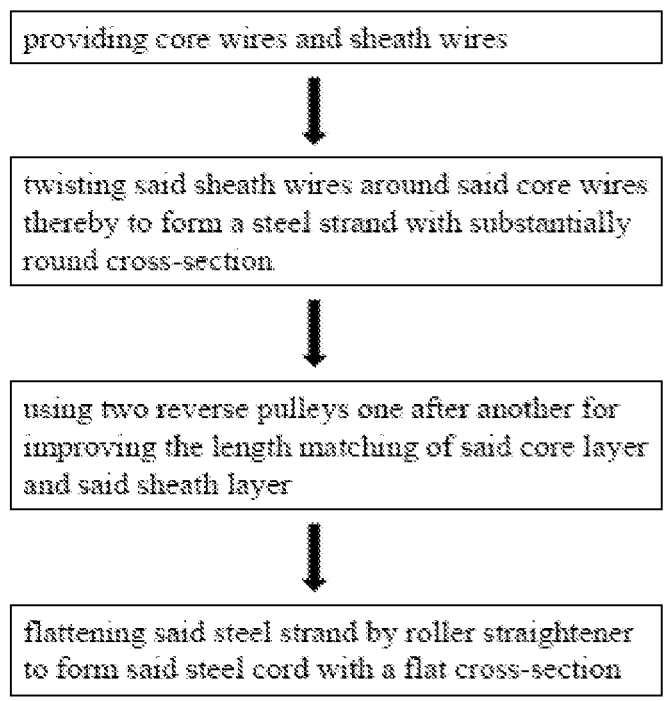
FIG. 4 shows a flow chart of a disclosed method for making a steel cord.

FIG. 3 illustrates the third embodiment of the invention. Third embodiment is 3+7. The steel cord 300 has three core wires 305 and seven sheath wires 310. The core wires 305 have a diameter of 0.20 mm while the sheath wires 310 have a diameter of 0.32 mm. The steel cord 300 has an elongation under the load of 50N with a preload of 2.5N is 0.06%. The flat ratio of the steel cord 300 is 1.37, and $BL_{cord}$/Sum $BL_{wires}$ is 98.3%, $BL_{cord}$ is 2256N. The core wires 305 have a twist pitch more than 300 mm, the sheath wires 310 have a twist pitch of 16 mm.

A comparison test is done. Table 1 shows the test result.

TABLE 1

|  | First embodiment | Reference 1 | Second embodiment | Reference 2 | Third embodiment | Reference 3 |
|---|---|---|---|---|---|---|
| Structure | 3/7 | 3/7 | 3/7 | 3/7 | 3 + 7 | 3 + 7 |
| Core wire diameter (mm) | 0.20 | 0.20 | 0.20 | 0.20 | 0.20 | 0.20 |
| Sheath wire diameter (mm) | 0.32 | 0.32 | 0.32 | 0.32 | 0.32 | 0.32 |
| Core wire twist pitch (mm) | 16 | 16 | 18 | 18 | >300 | >300 |
| Sheath wire twist pitch (mm) | 16 | 16 | 18 | 18 | 16 | 16 |
| Steel cord flat ratio | 1.52 | 1.53 | 1.50 | 1.44 | 1.37 | 1.47 |
| Length matching is improved | Yes | No | Yes | No | Yes | No |
| BL cord (N) | 2194 | 2078 | 2141 | 2053 | 2256 | 2172 |
| Sum BL of core wires (N) | 321.9 | 321.9 | 323.1 | 317.4 | 364.0 | 365.0 |
| Sum BL of sheath wires (N) | 1859.2 | 1858.5 | 1838.9 | 1842.4 | 1931.3 | 1932.0 |
| Sum BL of core wires and sheath wires (N) | 2181.1 | 2180.4 | 2162.0 | 2159.8 | 2295.3 | 2297.0 |
| $BL_{cord}$/Sum $BL_{wires}$ | 100.6% | 95.3% | 99.0% | 95.1% | 98.3% | 94.6% |

From the table, Sum BL of core and sheath wires has similar value between the invention steel cord and the reference cord, but the breaking load of the invention steel cord is much higher than the breaking load of the reference cord. This proves that improved length matching between the core layer and sheath layer plays a key role in improving the flat cord breaking load.

Figure 2:
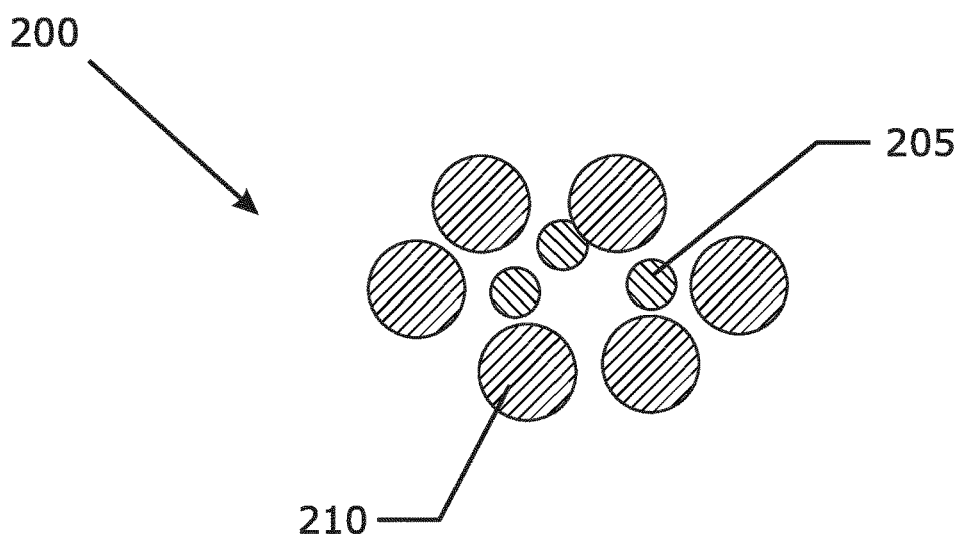
FIG. 2 shows an invention steel cord with a structure of 3/6 compact cord.

FIG. 2 illustrates the forth embodiment of the invention. Forth embodiment is 3/6. The steel cord 200 has three core wires 205 and six sheath wires 210. The core wires 205 have a diameter of 0.20 mm while the sheath wires 210 have a diameter of 0.30 mm. The steel cord 200 has an elongation under the load of 50N is 0.220%. The flat ratio of the steel cord 200 is 1.44, and $BL_{cord}$/Sum $BL_{wires}$ is 99.9%, $BL_{cord}$ is 1921N. The core wires 205 and the sheath wires 210 have the same twisting pitch of 16 mm.

The invention claimed is:

1. A steel cord, comprising a core layer and a sheath layer, said core layer comprising a plurality of core wires with a number of n and said sheath layer comprising a plurality of sheath wires with a number of m, said n ranges from 2 to 3, said m ranges from 6 to 12 said steel cord having a flattened cross-section with a major axis and a minor axis, said flattened cross-section having a flat ratio being the ratio of the length of said major axis and the length of said minor axis, said flat ratio being more than 1.2, said steel cord having a breaking load being $BL_{cord}$, the sum of the breaking load of said core wires and said sheath wires which are unraveled from said steel cord being Sum $BL_{wires}$ wherein, said $BL_{cord}$ and said Sum $BL_{wires}$ satisfies the following formula:

$$BL_{cord}/\text{SUM } BL_{wires} > 96\%.$$

2. The steel cord as claimed in claim 1, wherein said $BL_{cord}$ and said Sum $BL_{wires}$ satisfies the following formula:

$$BL_{cord}/\text{Sum} BL_{wires} > 97\%.$$

3. The steel cord as claimed in claim 1, wherein said flat ratio of said steel cord is less than 1.8.

4. The steel cord as claimed in claim 3, wherein said flat ratio of said steel cord is ranging from 1.25 to 1.50.

5. The steel cord as claimed in claim 1, wherein said a plurality of core wires have a twist pitch being more than 300 mm, said a plurality of sheath wires have a twist pitch being less than 30 mm.

6. The steel cord as claimed in claim 1, wherein said a plurality of core wires and said a plurality of sheath wires have the same twist pitch and the same twist direction.

7. A method for making a steel cord as claimed in claim 1, comprising the following steps:
   a) providing core wires and sheath wires;
   b) twisting said sheath wires around said core wires thereby to form a steel strand with substantially round cross-section;
   c) using two reverse pulleys one after another for improving the length matching of said core layer and said sheath layer;
   d) flattening said steel strand by roller straightener to form said steel cord with a flattened cross-section.

8. A reinforcing rubber article comprising the steel cord as claimed in claim 1.

9. A tire comprising a belt layer, a carcass layer, a tread layer and a pair of bead portions, wherein said belt layer is embedded with the steel cord as claimed in claim 1.

* * * * *

UNITED STATES PATENT AND TRADEMARK OFFICE
CERTIFICATE OF CORRECTION

PATENT NO. : 11,325,419 B2
APPLICATION NO. : 16/756591
DATED : May 10, 2022
INVENTOR(S) : Wang et al.

It is certified that error appears in the above-identified patent and that said Letters Patent is hereby corrected as shown below:

In the Claims

In Claim 1, Column 7, Line 22, "from 6 to 12 said" should read -- from 6 to 12, said --; and In Claim 1, Column 7, Line 32, "$BL_{cord}$/SUM $BL_{wires}$>96%" should read -- $BL_{cord}$/Sum $BL_{wires}$>96% --.

Signed and Sealed this
Twenty-eighth Day of June, 2022

Katherine Kelly Vidal
*Director of the United States Patent and Trademark Office*